(12) United States Patent
Lin et al.

(10) Patent No.: US 8,081,449 B2
(45) Date of Patent: Dec. 20, 2011

(54) HANDHELD ELECTRONIC DEVICE AND OPERATING METHOD THEREOF

(75) Inventors: Chien-Hung Lin, Taoyuan County (TW); Chen-Kuang Liu, Taoyuan County (TW); Chien-Ming Tseng, Taoyuan County (TW)

(73) Assignee: HTC Corporation, Taoyuan county (TW)

( * ) Notice: Subject to any disclaimer, the term of this patent is extended or adjusted under 35 U.S.C. 154(b) by 106 days.

(21) Appl. No.: 12/422,294

(22) Filed: Apr. 13, 2009

(65) Prior Publication Data
US 2010/0149742 A1   Jun. 17, 2010

(30) Foreign Application Priority Data

Dec. 12, 2008 (TW) .............................. 97148656 A

(51) Int. Cl.
*G06F 1/16* (2006.01)
*G06F 3/02* (2006.01)
*H04M 1/00* (2006.01)

(52) U.S. Cl. .............. 361/679.56; 361/679.55; 345/168; 345/905; 455/575.1; 455/575.3; 455/575.4

(58) Field of Classification Search .................. 345/156, 345/157, 168, 169, 905; 361/679.01–679.45, 361/679.55–679.59; 455/575.1, 575.3, 575.4, 455/905
See application file for complete search history.

(56) References Cited

U.S. PATENT DOCUMENTS
2007/0105606 A1* 5/2007 Yoon et al. ................. 455/575.4
2007/0279386 A1* 12/2007 Lewis et al. ................... 345/168
2008/0304215 A1 12/2008 Chiu FOREIGN PATENT DOCUMENTS
| CN | 101312624 | 11/2008 |
|---|---|---|
| CN | 101316491 | 12/2008 |
| EP | 1843559 | 10/2007 |

OTHER PUBLICATIONS

"Search report of Europe counterpart application", issued on Jul. 2, 2009, p. 1-p. 3.
"First Office Action of China Counterpart Application", issued on Feb. 1, 2011, p. 1-p. 6, in which the listed references were cited.

* cited by examiner

*Primary Examiner* — Jayprakash N Gandhi
*Assistant Examiner* — Nidhi Desai
(74) *Attorney, Agent, or Firm* — Jianq Chyun IP Office

(57) ABSTRACT

A handheld electronic device and an operating method thereof are provided. The handheld electronic device includes a first body, a second body, and a moving assembly. The moving assembly includes a sliding module and at least one rotating module. The sliding module is coupled to the second body, wherein the second body is moveable between a first position and a second position. The rotating module is coupled between the first body and the sliding module so that the second body is rotated relative to the first body. The second body is automatically rotated from the second position to a third position to form a first angle with the first body. The second body can be rotated between the third position and a fourth position to form a second angle with the first body, wherein the second angle is greater than the first angle.

8 Claims, 14 Drawing Sheets

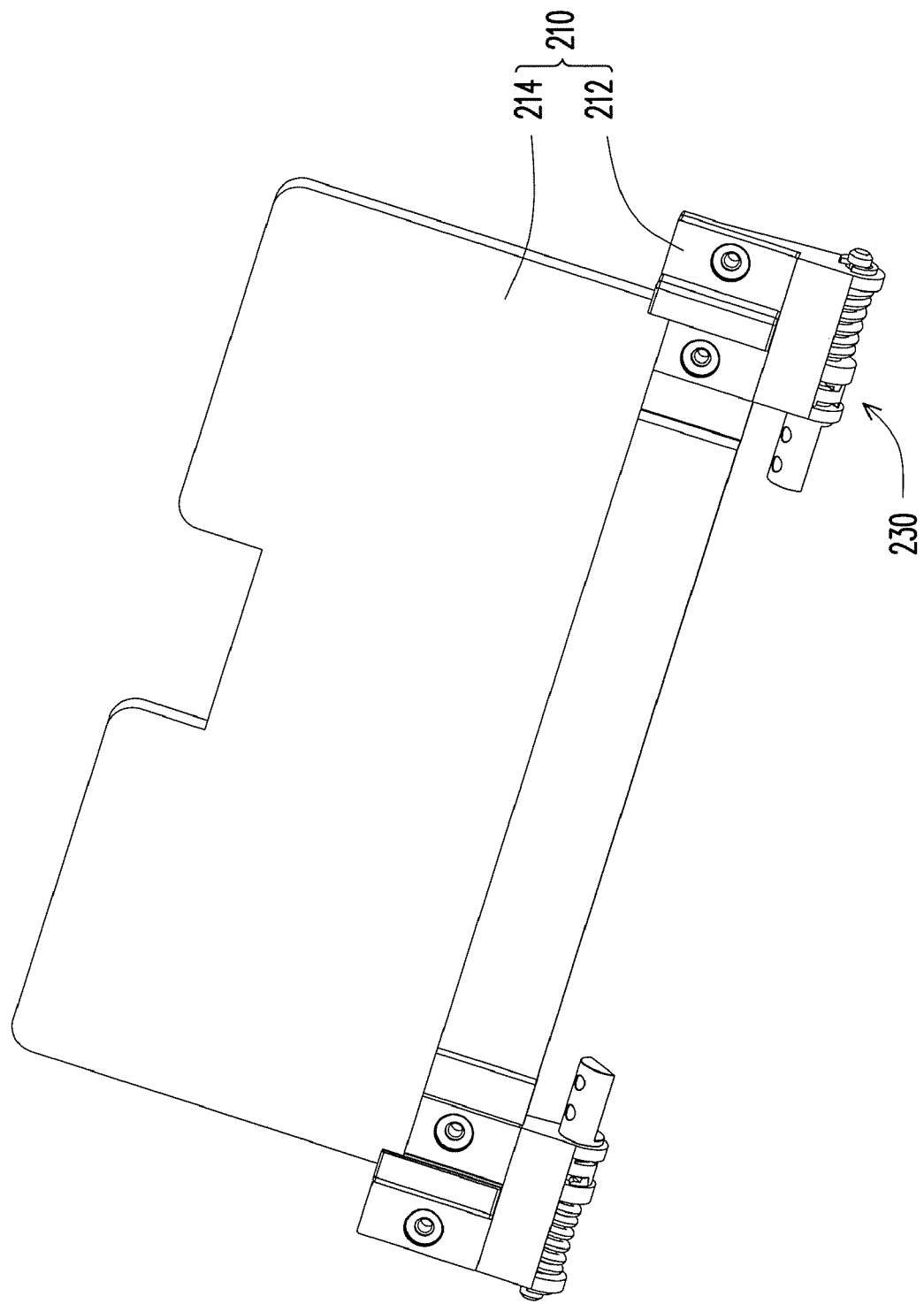

HANDHELD ELECTRONIC DEVICE AND OPERATING METHOD THEREOF

CROSS-REFERENCE TO RELATED APPLICATION

This application claims the priority benefit of Taiwan application serial No. 97148656, filed on Dec. 12, 2008. The entirety of the above-mentioned patent application is hereby incorporated by reference herein and made a part of this specification.

BACKGROUND OF THE INVENTION

1. Field of the Invention

The present application relates to a handheld electronic device and an operating method thereof. More particularly, the present application relates to a handheld electronic device capable of automatically rotating, and an operating method thereof.

2. Description of Related Art

With development of technology, people increasingly depend on electronic devices in their daily life. As the electronic devices are required to have a high operation performance and features of lightness, slimness, shortness and smallness, various electronic devices such as ultra mobile personal computers (UMPC), tablet PC, pocket PC, personal digital assistants (PDA), cell phones and notebook PC are developed.

To improve an input convenience of typewriting, a QWERTY-like keyboard can be applied to a body of the handheld electronic device. However, if the keyboard and a display screen are located at a same surface of a same body, the body with a relatively great area size is required to simultaneously contain the keyboard and the display screen. Therefore, most of the present handheld electronic devices apply a two-layer folding body design or a two-layer sliding body design to respectively dispose the display screen and the keyboard on the two-stacked bodies, so as to miniaturize the body area of the handheld electronic device.

Here, the two-layer sliding body is taken as an example, an operation method thereof is to exert a force to slide the display screen to a side of the keyboard, so as to expose the keyboard and facilitate a user to perform inputting. However, according to such design, since the display screen and the keyboard are maintained in a parallel state, the user cannot change an angle between the display screen and the keyboard according to his viewing angle and operation habit, which may result in a fact that the user has to change a pose or frequently move the handheld electronic device to simultaneously cope with requirements of an input operation and a screen viewing. Therefore, the display screen and the keyboard that can simultaneously cope with the requirements of the input operation and the screen viewing are required to be developed.

SUMMARY OF THE INVENTION

The present application is directed to a handheld electronic device, in which when a display screen is slid to a specific position, the display screen can be automatically rotated.

The present application is directed to an operating method for a handheld electronic device, by which a user can conveniently operate the handheld electronic device.

The present application provides a handheld electronic device including a first body, a second body, and a moving assembly, wherein the moving assembly is disposed between the first body and the second body. The moving assembly includes a sliding module and at least one rotating module. The sliding module is coupled to the second body, wherein the second body is moveable between a first position and a second position through the sliding module. The rotating module is coupled between the first body and the sliding module, so as to rotate the second body relative to the first body. The second body is automatically rotated from the second position to a third position to form a first angle with the first body, and the second body can further be rotated between the third position and a fourth position to form a second angle with the first body, wherein the second angle is greater than the first angle.

The present application provides a method for operating a handheld electronic device. The method can be described as follow. First, the handheld electronic device is provided. Next, a force is applied to the second body to slide the second body from the first position to the second position, and now the second body is automatically rotated from the second position to a third position, and accordingly the handheld electronic device enters a first operation mode.

In the present application, when the second body is slid to a side of the first body, the second body is automatically rotate relative to the first body, and the angle formed between the second body and the first body can be adjusted according to actual requirement of the user. By such means, the user can operate the handheld electronic device more conveniently, and can adjust the angle between the bodies to simultaneously satisfy requirements of an input operation and a screen viewing. Therefore, the handheld electronic device and the operating method thereof of the present application are rather practical and convenient.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6B is a schematic diagram illustrating a moving assembly of FIG. 6A located at the fourth position.

DESCRIPTION OF EMBODIMENTS

Figure 1A:
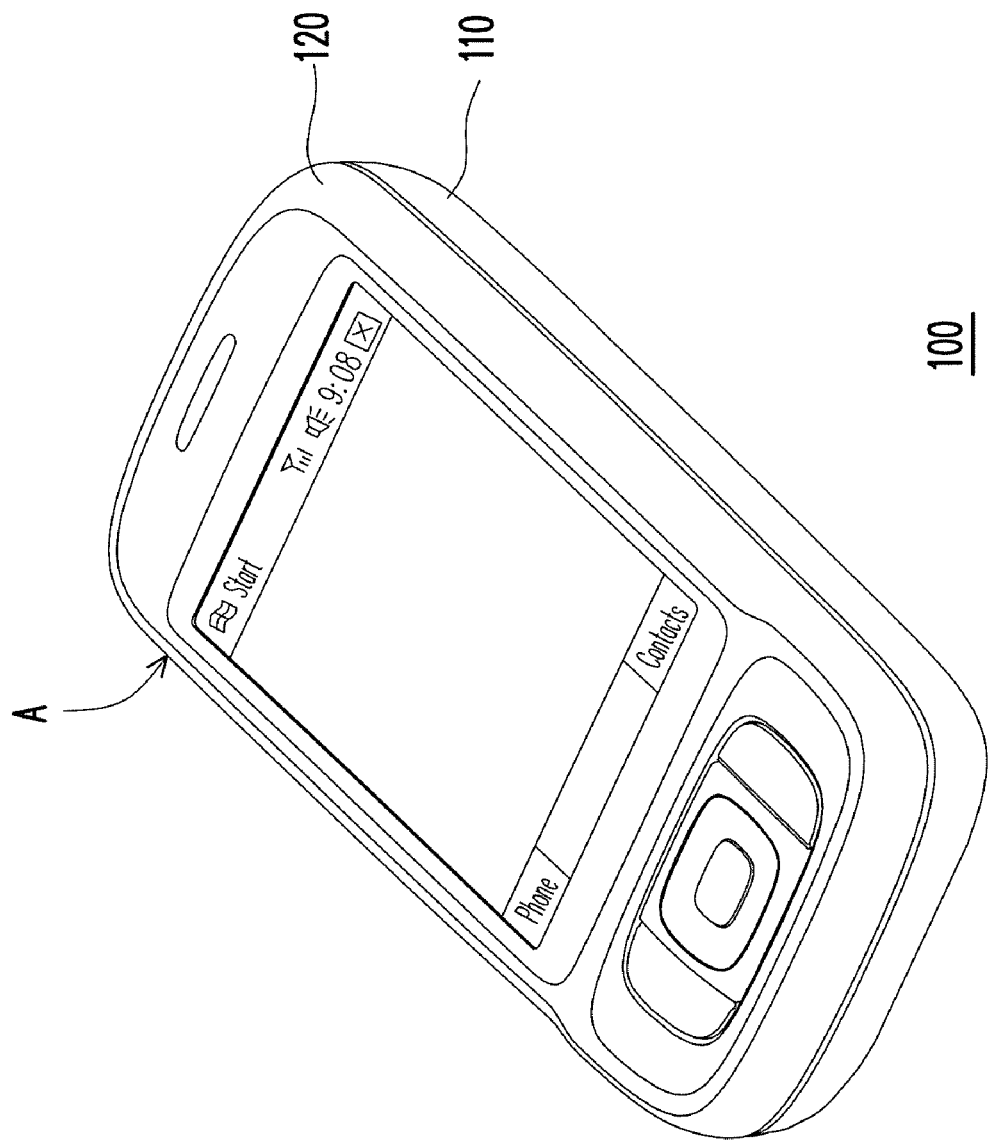
FIG. 1A is a schematic diagram illustrating a handheld electronic device according to an embodiment of the present invention.
Figure 1B:
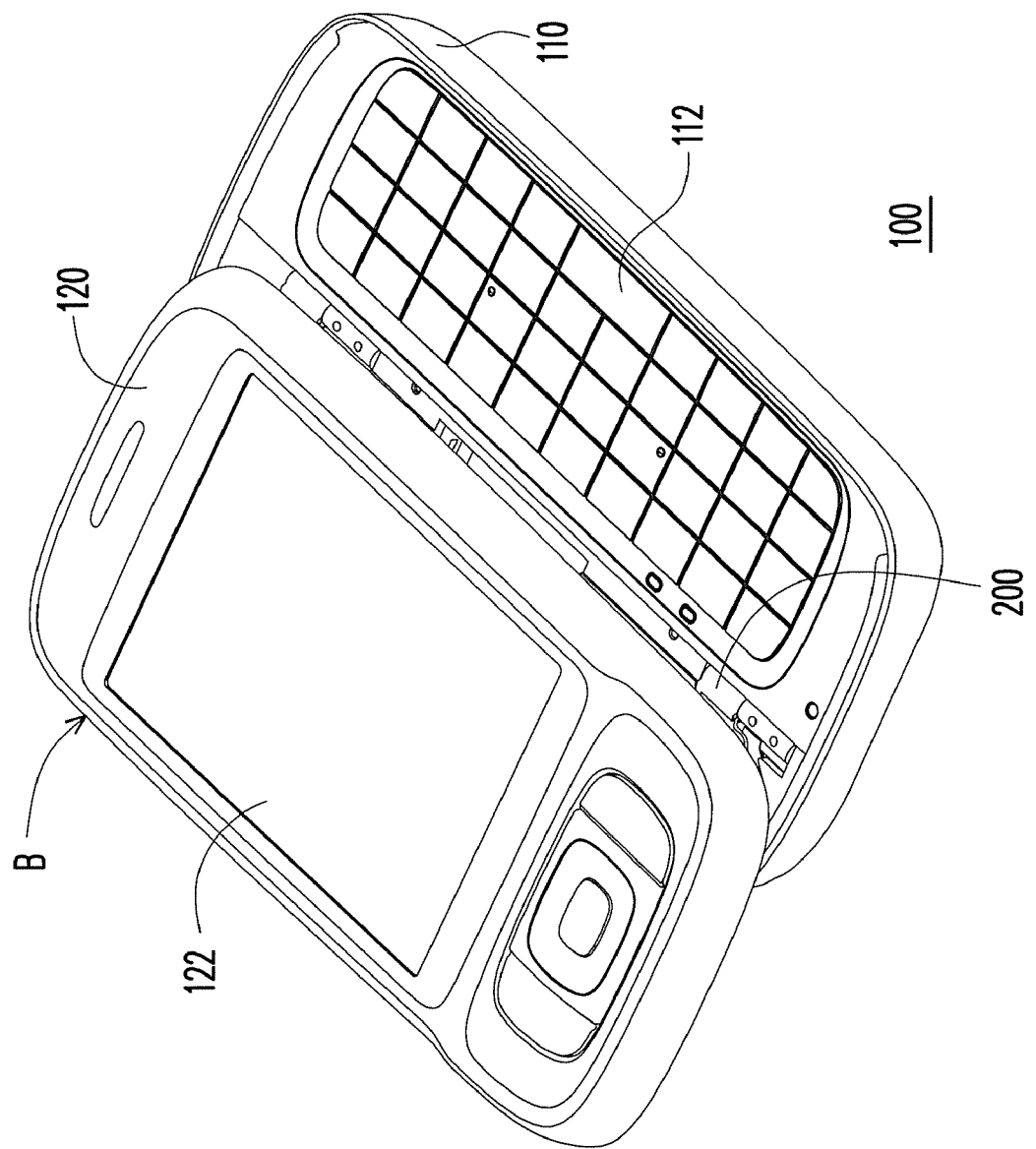
FIG. 1B is a schematic diagram illustrating a handheld electronic device of FIG. 1A when a second body thereof is located at a second position.
Figure 2:
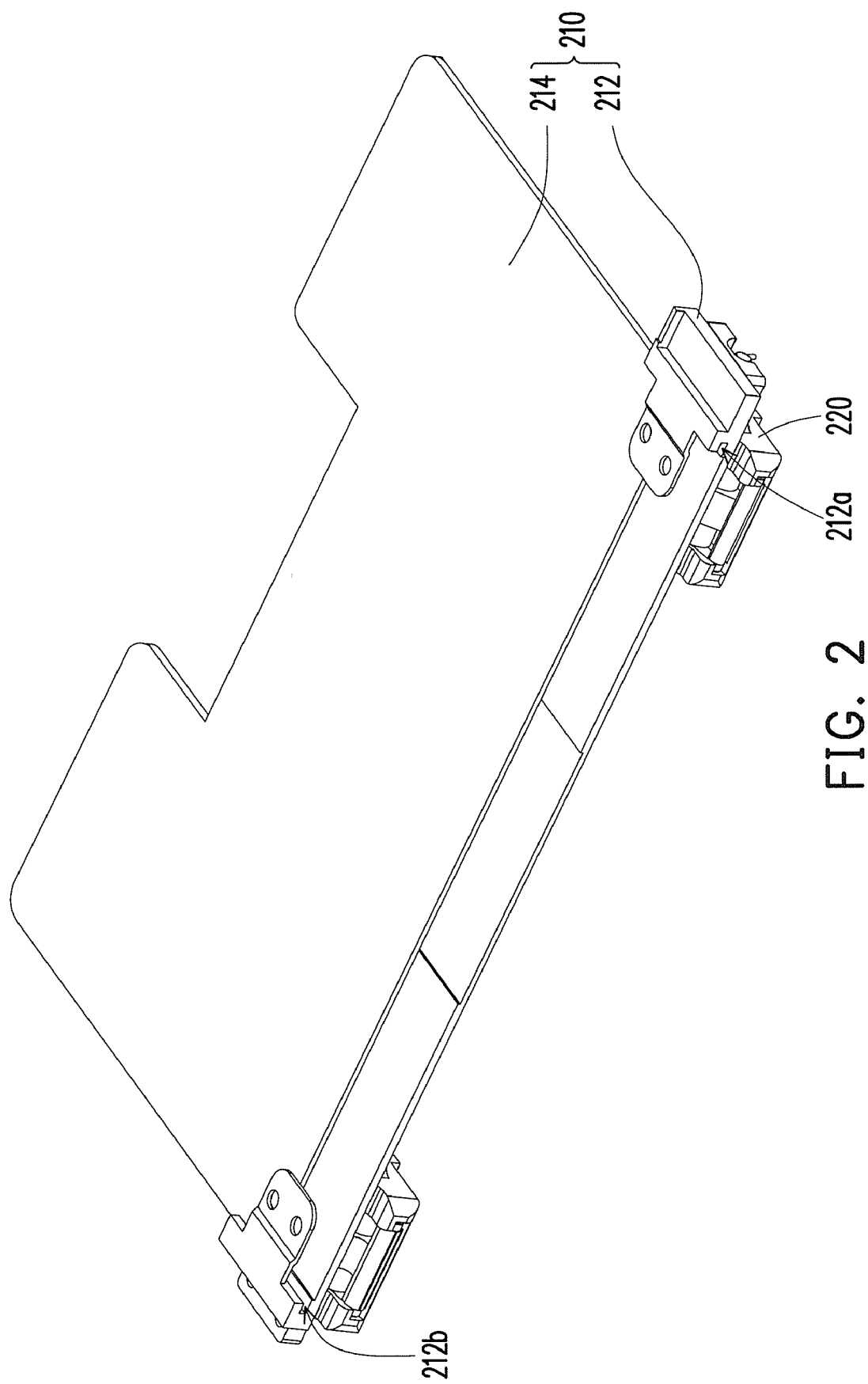
FIG. 2 is a schematic diagram of a moving assembly of FIG. 1B.

FIG. 1A is a schematic diagram illustrating a handheld electronic device according to an embodiment of the present invention. FIG. 1B is a schematic diagram illustrating the handheld electronic device of FIG. 1A when a second body thereof is located at a second position. FIG. 2 is a schematic diagram of a moving assembly of FIG. 1B, and in FIG. 2, a first body and the second body are omitted to clearly illustrate the moving assembly. Referring to FIG. 1A, FIG. 1B and FIG. 2, the handheld electronic device 100 of the present embodiment includes a first body 110, a second body 120 and a moving assembly 200. The first body 110 includes a keyboard 112, the second body 120 includes a display screen 122, and the moving assembly 200 is disposed between the first body 110 and the second body 120.

The moving assembly 200 includes a sliding module 210 and at least one rotating module 220. The sliding module 210 is coupled to the second body 120. The second body 120 is moveable between a first position A and a second position B through the sliding module 210. The rotating module 220 is coupled between the first body 110 and the sliding module 210, so as to rotate the second body 120 relative to the first body 110.

Figure 3A:
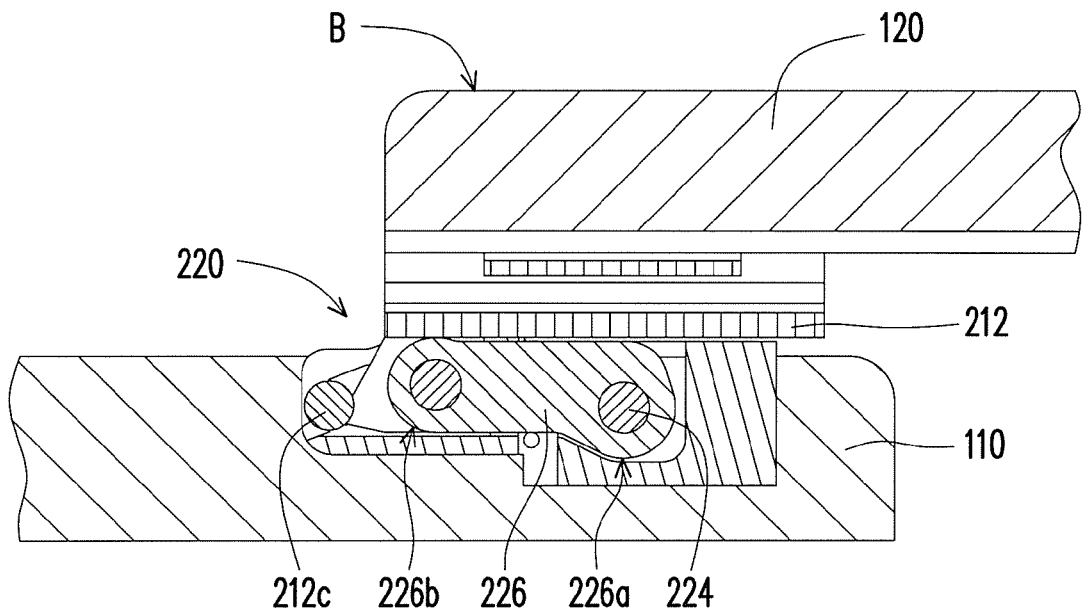
FIG. 3A is a cross-sectional view of a handheld electronic device of FIG. 1A when a second body thereof is located at a second position.
Figure 3B:
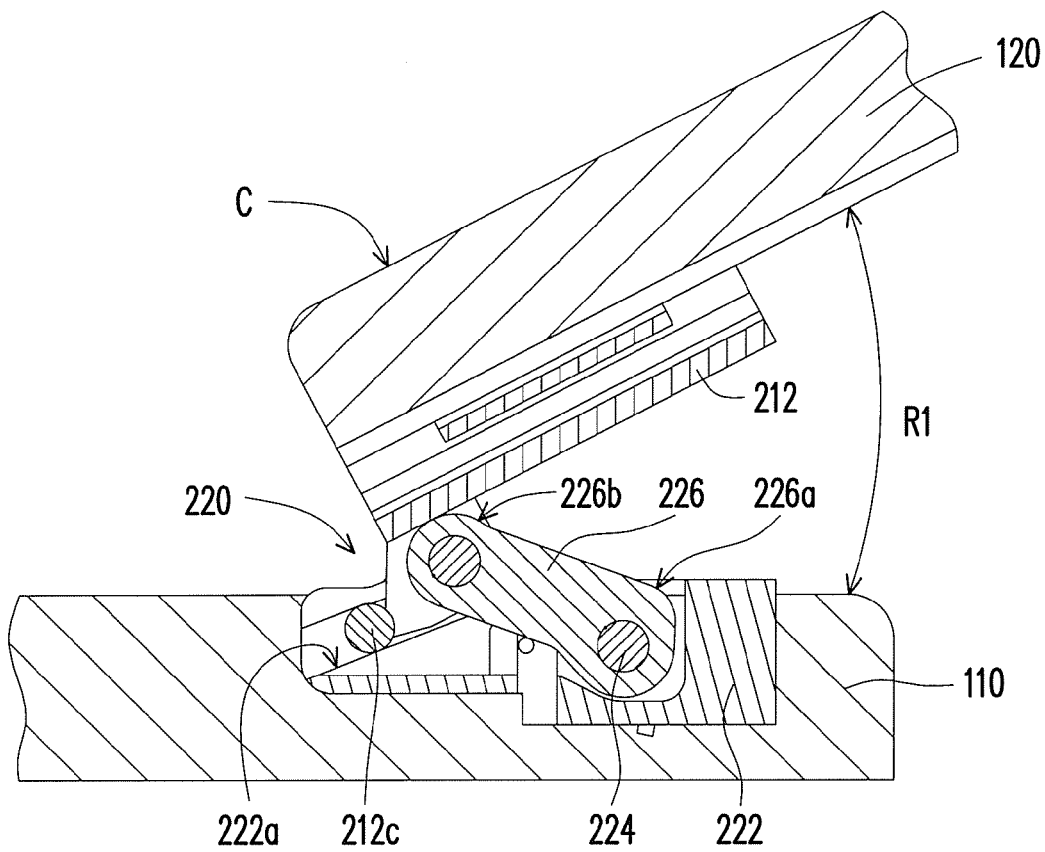
FIG. 3B is a cross-sectional view of a second body of FIG. 3A located at a third position.
Figure 3C:
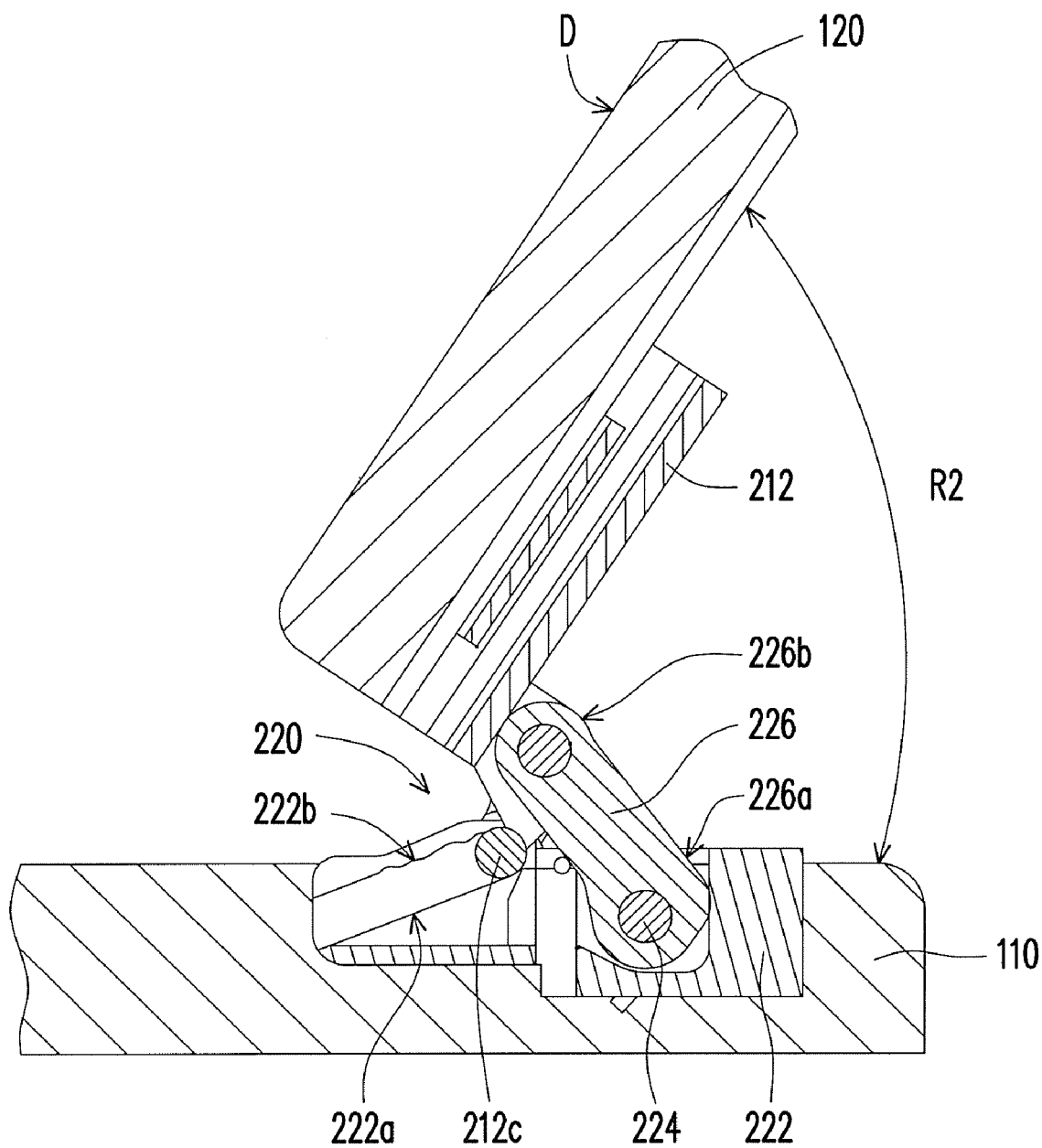
FIG. 3C is a cross-sectional view of a second body of FIG. 3A located at a fourth position.

FIG. 3A is a cross-sectional view of the handheld electronic device of FIG. 1A when the second body thereof is located at the second position. FIG. 3B is a cross-sectional view of the second body of FIG. 3A located at a third position. FIG. 3C is a cross-sectional view of the second body of FIG. 3A located at a fourth position. Referring to FIG. 3A to FIG. 3C, the second body 120 is automatically rotated from the second position B to a third position C through the rotating module 220, and now the second body 120 forms a first angle R1 with the first body 110. Moreover, the second body 120 can further be rotated between the third position C and a fourth position D, and now the first body 110 and the second body 120 form a second angle R2, wherein the second angle R2 is greater than the first angle R1.

In the handheld electronic device 100 of the present application, when the second body 120 is slid to the second position B relative to the first body 110 through the sliding module 210, the rotating module 220 automatically rotates the second body 120 to the third position C relative to the first body 110. By such means, the user can easily tilt the second body 120 relative to the first body 110 by sliding out the second body 120, so as to spread the handheld electronic device. Moreover, the second body 120 can further be rotatable between the third position C and the fourth position D relative to the first body 100, and stops at a suitable position, so that the user can adjust the second body 120 to a suitable angle according to a viewing-angle requirement. Therefore, the handheld electronic device 100 of the present application is practical and convenient.

Referring to FIG. 3A to FIG. 3C, in the handheld electronic device 100 of the present embodiment, the second body 120 is automatically rotated relative to the first body 110 through the rotating module 220. When the second body 120 is located at the third position C, the first angle R1 formed between the second body 120 and the first body 110 is greater than approximately 0 degree and less than approximately 20 degrees. For example, if the user holds the handheld electronic device 100 by hands, and when the first angle R1 is formed between the second body 120 and the first body 110, the user can comfortably operate the keyboard 112 while simultaneously viewing the display screen 122. Moreover, when the second body 120 is located at the fourth position D, the second angle R2 formed between the second body 120 and the first body 110 is between approximately 20 degrees and approximately 50 degrees. For example, if the handheld electronic device 100 is disposed on a desk, and when the second angle R2 is formed between the second body 120 and the first body 110, the user can comfortably operate the keyboard 112 while simultaneously viewing the display screen 122. Now, the spread angle between the second body 120 and the first body 110 of the handheld electronic device 100 is relatively similar to a using state of a general notebook computer.

In other words, in the handheld electronic device 100 of the present application, the second body 120 has two different rotation stages corresponding to different using states of the user. In detail, if the user holds the handheld electronic device 100 by hands, and when the second body 120 is pushed from the first position A to the second position B, the second body 120 is automatically rotated to the third position C, which is a hold position of a first stage. Namely, the firs angle R1 is greater than approximately 0 degree and less than approximately 20 degrees. If the handheld electronic device 100 is further disposed on the desk for operation, the second body 120 is rotated for a second stage, i.e., the second body 120 is rotated to the fourth position D, which is a hold position of the second stage. Namely, the second angle R2 is between approximately 20 to approximately 50 degrees.

Referring to FIG. 2 again, the sliding module 210 includes a fixing member 212 and a moving member 214, wherein the fixing member 212 is connected to the rotating module 220. The fixing member 212 has two grooves 212a and 212b disposed opposite to one another. The moving member 214 is fit into the grooves 212a and 212b, so that the moving member 214 is slidably coupled between the fixing member 212 and the second body 120.

Figure 4A:
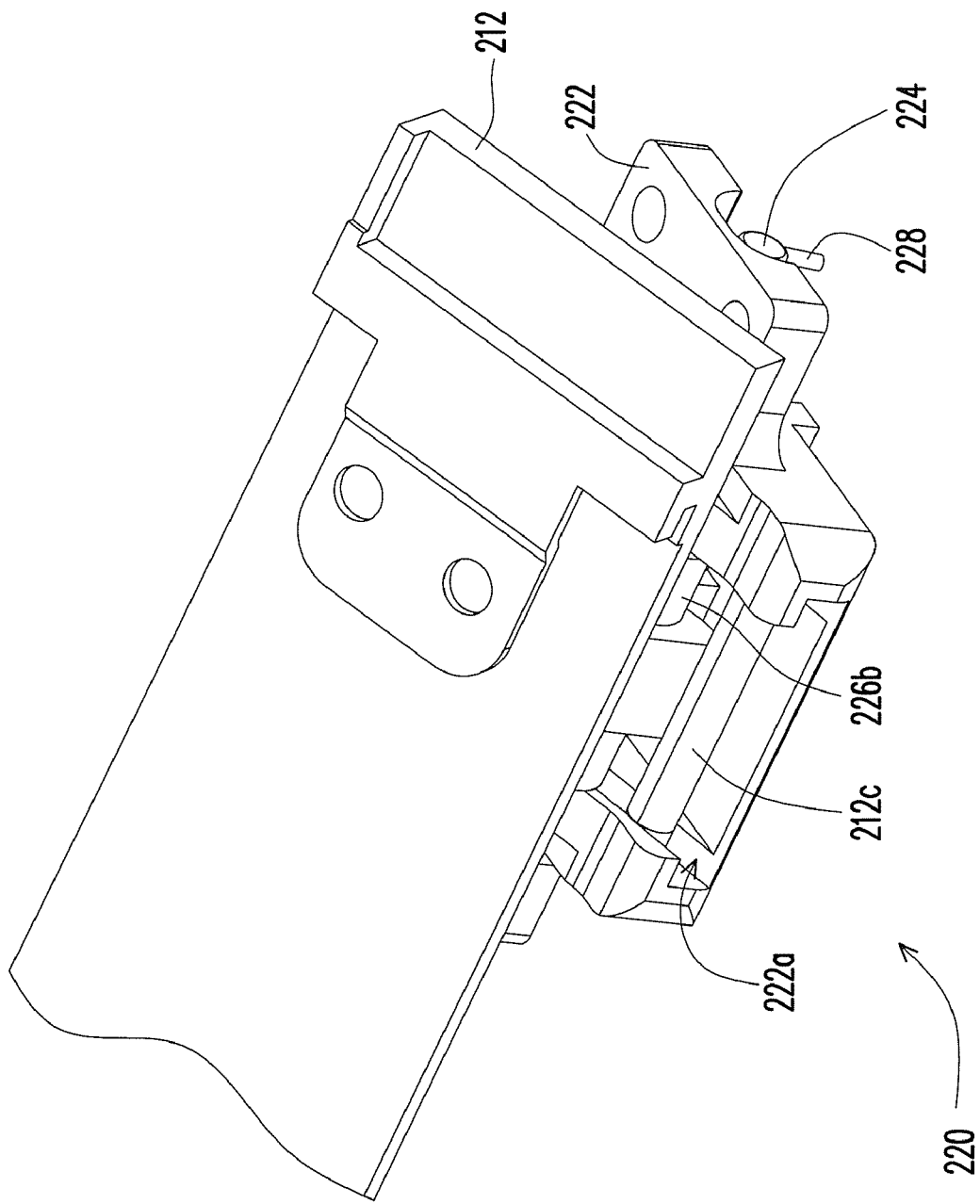
FIG. 4A is a partial amplified view of a moving assembly of FIG. 2.
Figure 4B:
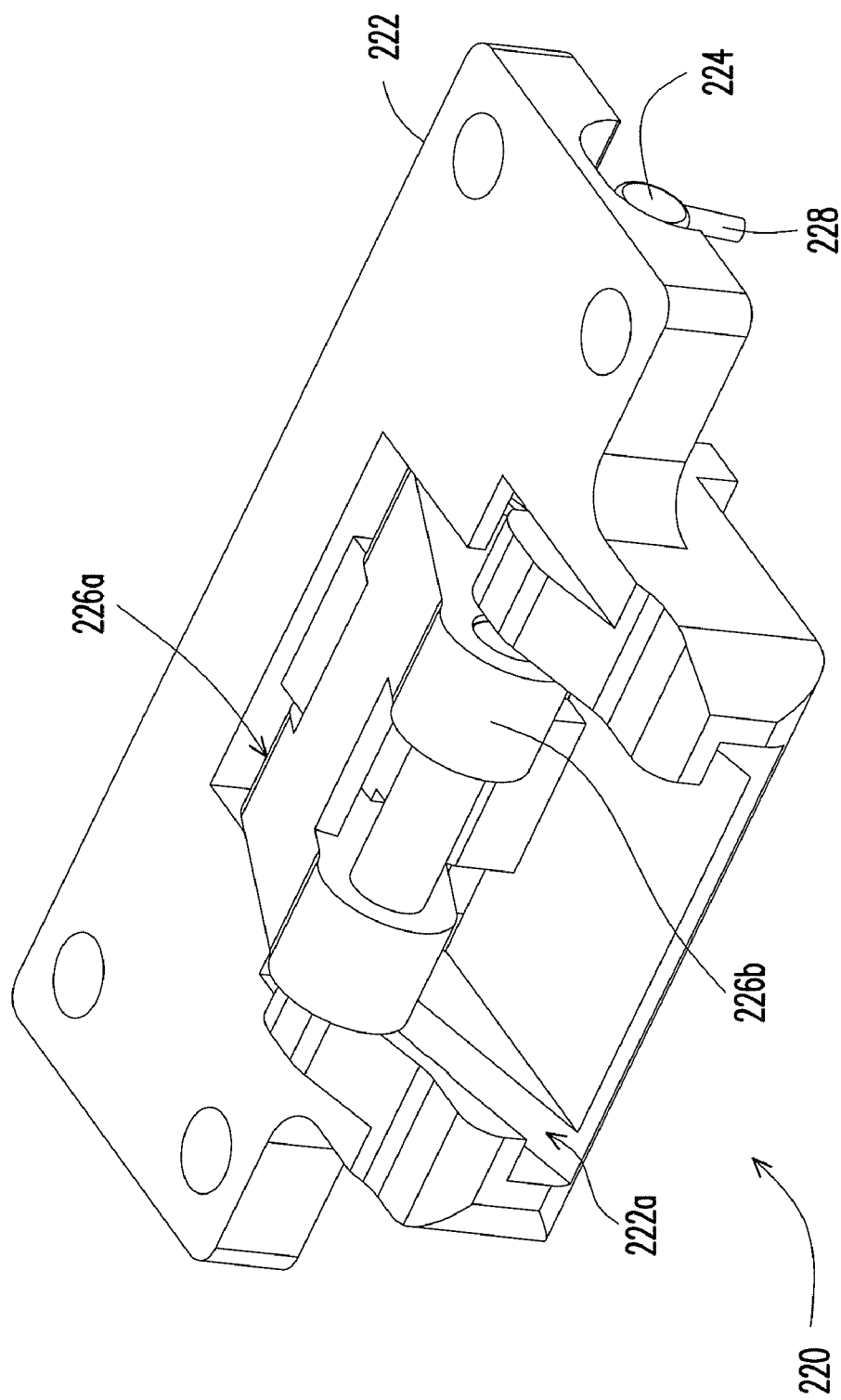
FIG. 4B is a schematic diagram of a moving assembly of FIG. 4A without a fixing member.

FIG. 4A is a partial amplified view of the moving assembly of FIG. 2. FIG. 4B is a schematic diagram of the moving assembly of FIG. 4A without the fixing member. Referring to FIG. 4A and FIG. 4B, the rotating module 220 includes a base 222, a pivot 224, a linking-up member 226 and an elastic member 228. The base 222 has a track 222a, and the pivot 224 is pivotally connected to the base 222. The linking-up member 226 has a first connecting part 226a and a second connecting part 226b, wherein the first connecting part 226a is connected to the pivot 224, and the second connecting part 226b is pivotally connected to the fixing member 212. Moreover, the fixing member 212 further includes a sliding block 212c slidably connected to the track 222a.

Figure 5:
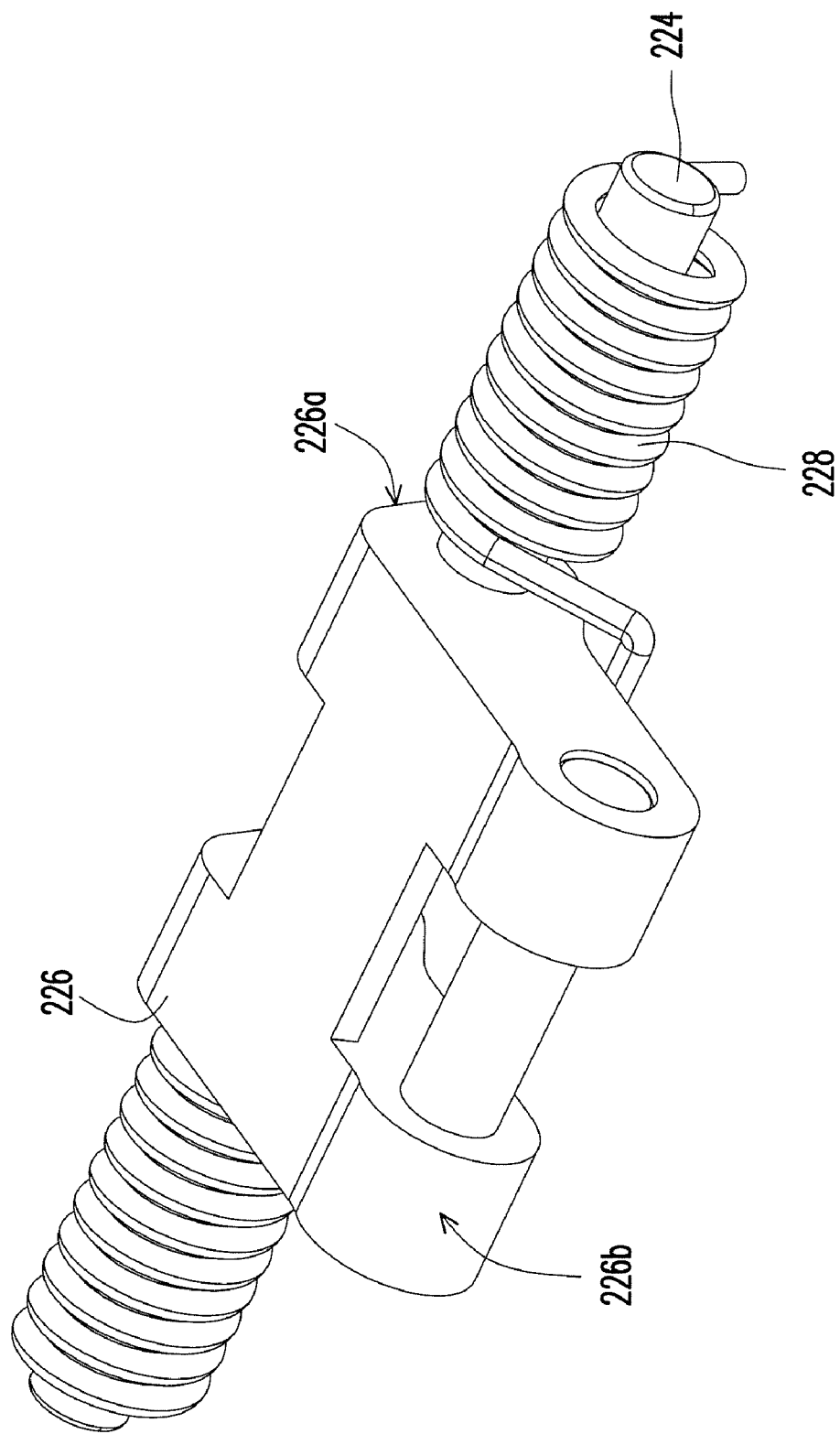
FIG. 5 is a schematic diagram illustrating a rotating module of FIG. 4B without a base.

FIG. 5 is a schematic diagram illustrating the rotating module of FIG. 4B without the base. Referring to FIG. 4A, FIG. 4B and FIG. 5, in the present embodiment, the elastic member 228 is, for example, a torsion spring covering the pivot 224. Two ends of the elastic member 228 respectively lean against the linking-up member 226 and the base 222. When the second body 120 (shown as FIG. 1B) is still not slid to the second position B, the elastic member 228 is in a deformation state. However, limited by interference of the bodies in a rotation direction of the second body 120 relative to the first body 110, the elastic member 228 is still maintained in the deformation state. When the second body 120 is located at the second position B, the interference of the bodies is no longer existed, so that an elastic resilience of the elastic member 228 can drive the linking-up member 226 to rotate relative to the pivot 224, so that the second body 120 can automatically rotate relative to the first body 110. Meanwhile, since the fixing member 212 is also rotated along with the second body 120, the sliding block 212c is accordingly slid along the track 222a. When the sliding block 212c interferes the track 222a, the sliding block 212c is then stopped in the track 222a. Now, the second body 120 and the first body 110 form the first angle R1, as that shown in FIG. 3B.

Moreover, referring to FIG. 3B and FIG. 3C, in the present embodiment, the track 222a further has a plurality of indentations 222b. When the second body 120 is rotated between the third position C and the fourth position D, the second body 120 drives the fixing member 212 to rotate, so that when the sliding block 212c is slid on the track 222a, the indentations 222b provides a plurality of hold points for the sliding block 212c during the rotation of the second body 120, which can facilitate the user to adjust the angle between the second body 120 and the first body 110. Here, the positions of the indentations 222b on the track 222a are not limited by the present application, which can be designed according to the actual utilization requirements, so as to hold the second body 120 at any position between the third position C and the fourth position D. However, if the sliding block 212c interferes with a rear section of the track 222a, the second body 120 can be arbitrarily held at any position during a second stage rotation thereof. The track 222a can be designed to include the indentations 222b or to interfere with the sliding block 212c, which can all hold the second body 120 at any position between the third position C and the fourth position D. Namely, the user can arbitrarily adjust a tilting angle of the second body 120 during the second stage rotation thereof.

Moreover, if a quantity of the indentations 222b is one, and when the user rotates the second body 120 to drive the sliding block 212c passing through an interference area between the sliding block 212c and the track 222a, the second body 120 then can be automatically rotated to the fourth position D. In other words, the rotation of the second body 120 in the first stage is an automatic rotation, and the rotation of the second body 120 in the second stage can be a semi-automatic rotation.

Figure 6A:
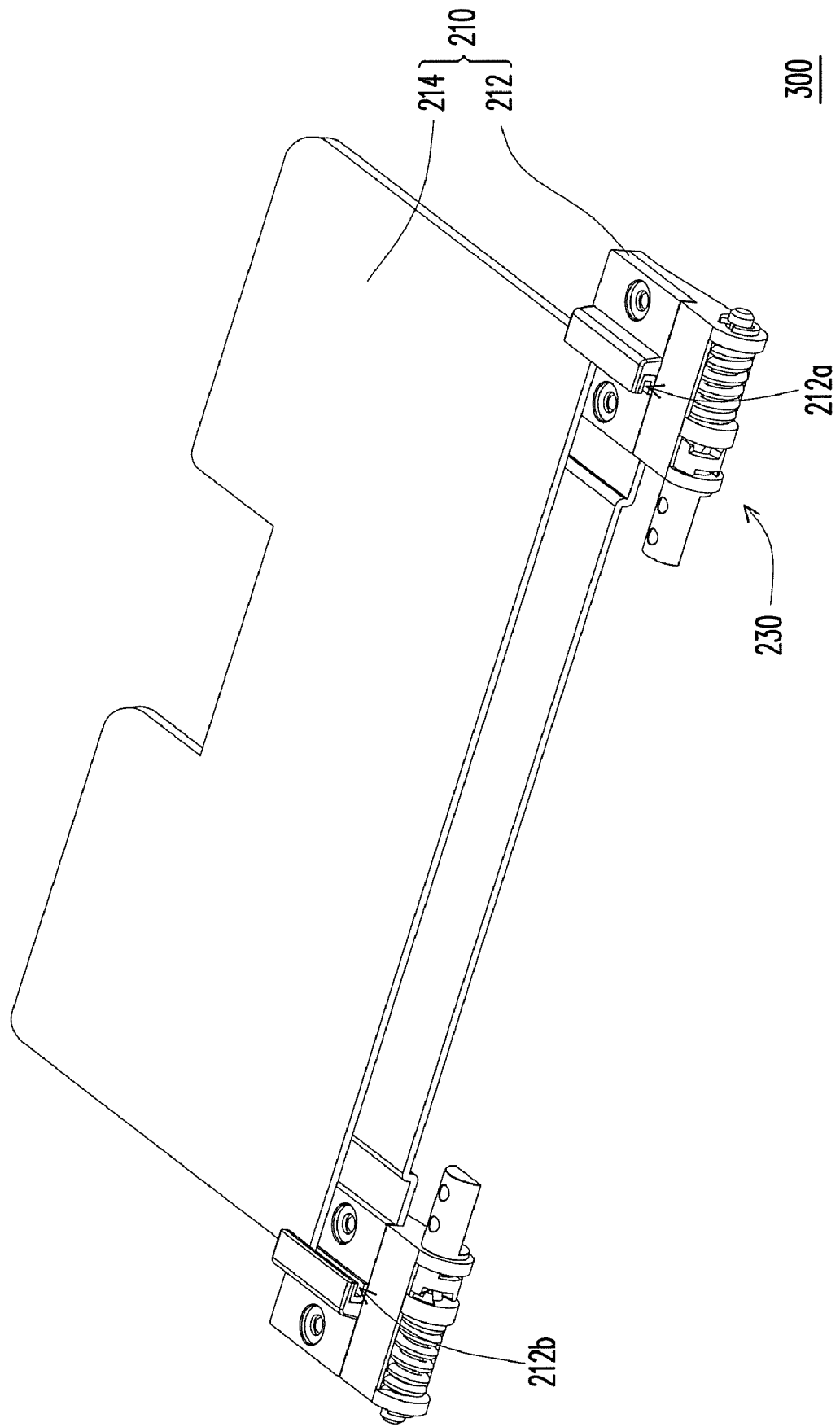
FIG. 6A is a schematic diagram illustrating a moving assembly according to another embodiment of the present invention.
Figure 7A:
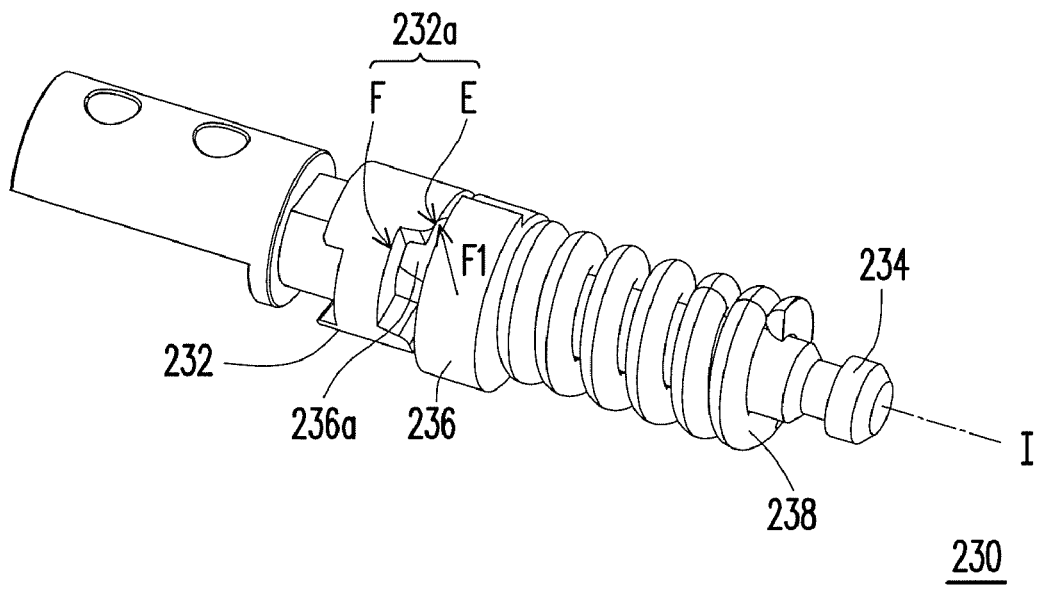
FIG. 7A to FIG. 7C are schematic diagrams of a rotating module of FIG. 6A located at different positions.
Figure 7B:
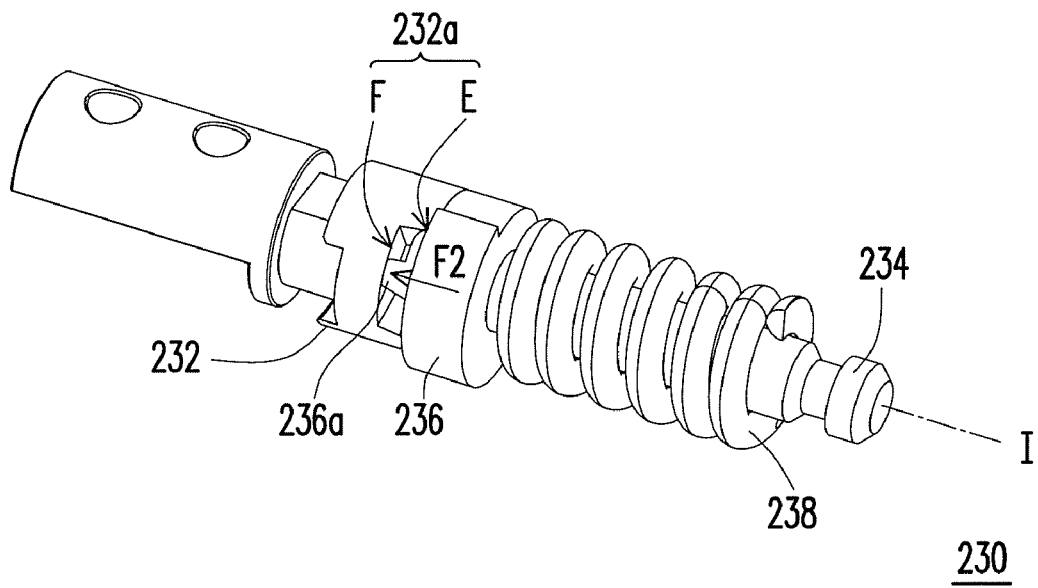
Figure 7C:
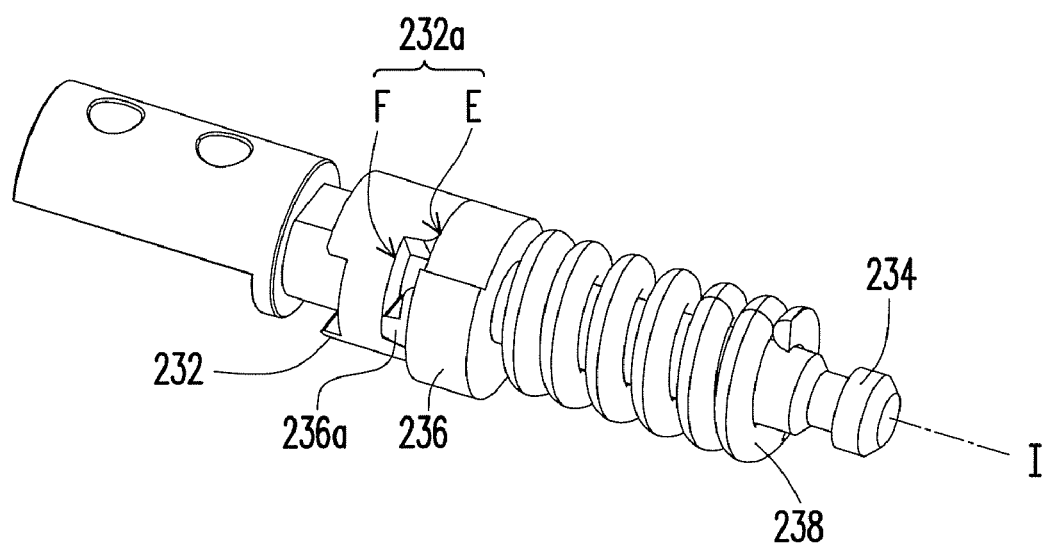
Figure 7D:
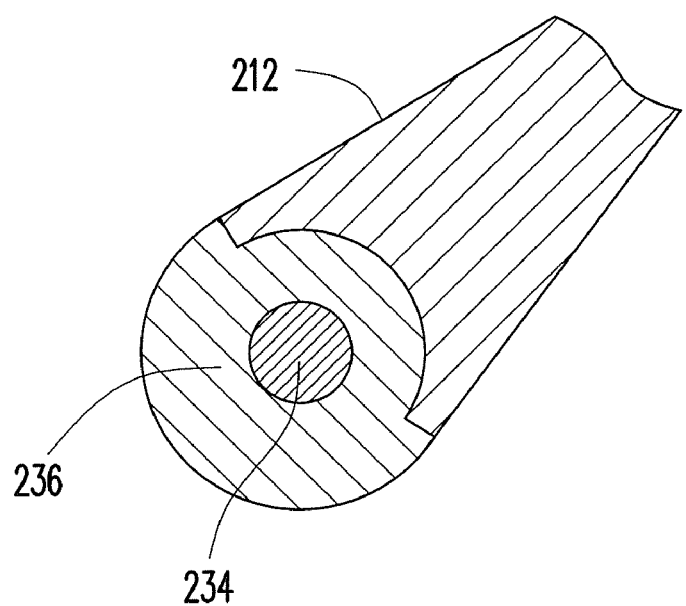
FIG. 7D is a cross-sectional view of a linking-up member in a rotating module of FIG. 7A.

FIG. 6A is a schematic diagram illustrating a moving assembly according to another embodiment of the present invention. FIG. 6B is a schematic diagram illustrating the moving assembly of FIG. 6A located at the fourth position. FIG. 7A to FIG. 7C are schematic diagrams of a rotating module of FIG. 6A located at different positions. FIG. 7D is a cross-sectional view of a linking-up member in the rotating module of FIG. 7A. Referring to FIG. 6A, FIG. 6B and FIGS. 7A-7D, in the present embodiment, the moving assembly 300 includes a rotating module 230 different to that in the aforementioned embodiment. The rotating module 230 includes a base 232, a pivot 234, a linking-up member 236 and an elastic member 238. The base 232 is fixed to the first body 110 (shown as FIG. 1B), and has a track 232a. The pivot 234 is fixed to the base 232. The linking-up member 236 covers the pivot 234 and is engaged to the fixing member 212. The linking-up member 236 has a protrusion 236a slidably disposed in the track 232a. The elastic member 238 is, for example, a coil spring covering the pivot 234, and two ends thereof respectively lean against the linking-up member 236 and the base 232 to push the linking-up member towards the track 232a.

In the present embodiment, the track 232a has a first section E and a second section F. When the second body 120 is located between the first position A and the second position B, the protrusion 236a is located at the first section E of the track 232a. Since one of the surfaces of the protrusion 236a and the first section E is a curved surface, a direction of a force F1 between the protrusion 236a and the track 232a forms an acute angle with an axial direction I of the pivot 234.

In other words, now the protrusion 236a is in an unstable state, and the elastic member 238 drives the protrusion 236a to move towards the second section F of the track 232a. However, since now the second body 120 and the first body 110 are mutually overlapped and interfered, the protrusion 236a is maintained at the first section E. Referring to FIG. 7A and FIG. 7B, when the second body 120 is located at the second position B (shown as FIG. 1B), the interference between the second body 120 and the first body 110 is disappeared, and the protrusion 236a is moved from the first section E to the second section F, so that the linking-up member 236 drives the second body 120 to automatically rotate from the second position B to the third position C (shown as FIG. 3B and FIG. 3C). When the second body 120 is located at the third position C, the protrusion 236a is located at the second section F of the track 232a, and now a direction of a force F2 between the first connecting part 226a and the track 222a is parallel to the axial direction I of the pivot 224. Therefore, the first connecting part 226a located at the second section F is in a stable state. Moreover, the elastic member 238 can continually lean against the linking-up member 236 to push the linking-up member 236 towards the track 232a, which results in a fact that the second section F of the track 232a interferes the protrusion 236a, so that the second body 120 can be arbitrarily held at any position between the third position C and the fourth position D. Namely, the user can arbitrarily adjust a tilting angle of the second body 120 during the second stage rotation thereof. Conversely, if the elastic member 238 now does not lean against the linking-up member 236, namely, if the second section F of the track 232a is not interfered with the protrusion 236a, the second body 120 is directly rotated from the third position C to the fourth position D. Therefore, the second body 120 can be automatically rotated in the first stage, and can be arbitrarily held at any position during the second stage rotation.

However, in another embodiment, if the second section F of the track 232a is not levelled, and has a height step or a protrusion (shown as the indentation 222b of FIG. 3C), when the protrusion 236a slides over the second section F of the track 232a having the height step or the protrusion, the second body 120 can be automatically rotated to the fourth position D. Therefore, the rotation of the second body 120 in the second stage can be designed to be the semi-automatic rotation.

Figure 8:
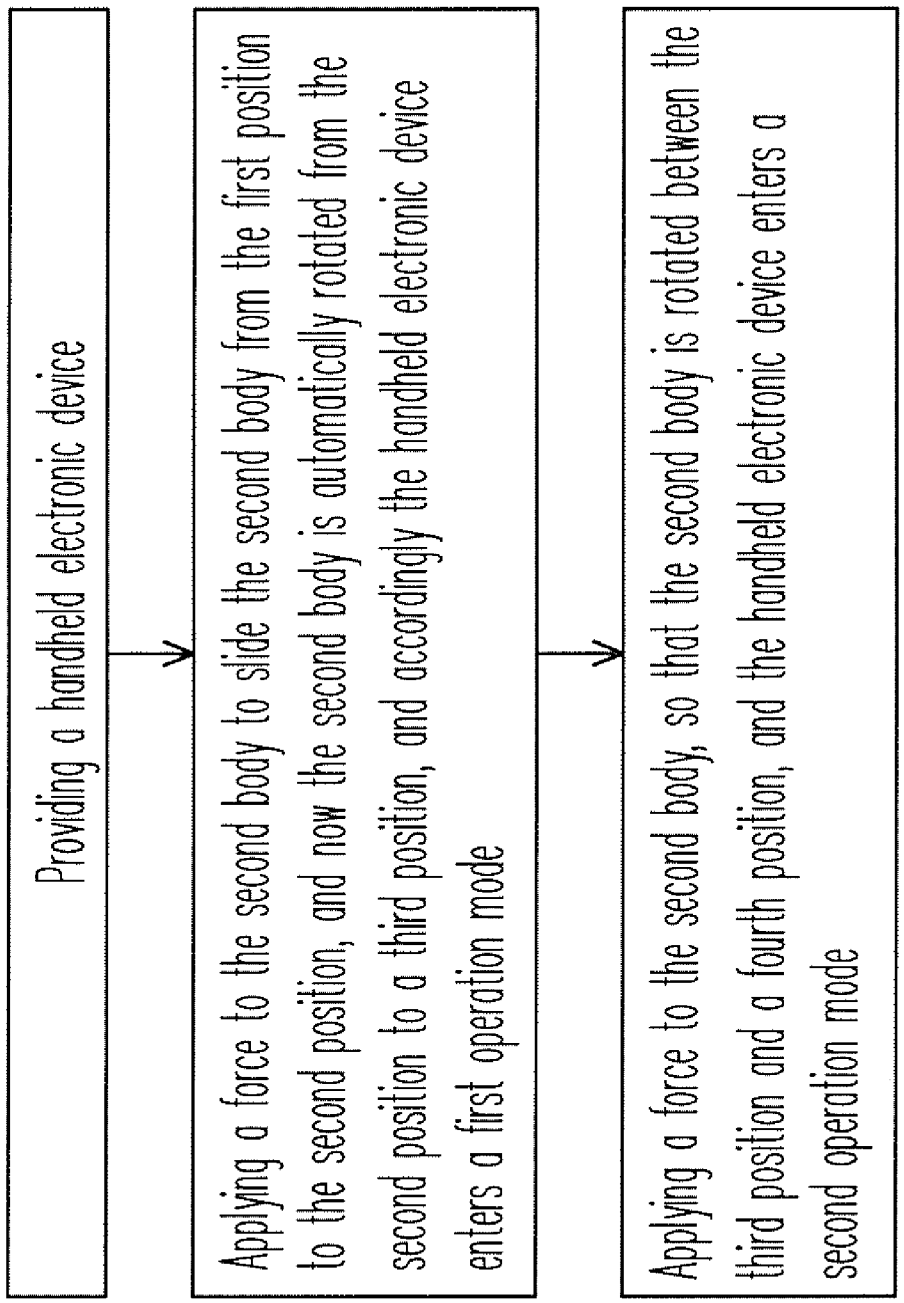
FIG. 8 is an operation flowchart of a handheld electronic device according to an embodiment of the present invention.

FIG. 8 is an operation flowchart of a handheld electronic device according to an embodiment of the present invention. Referring to FIG. 8, the operating method of the handheld electronic device 100 includes following steps. First, the aforementioned handheld electronic device 100 is provided. The related descriptions of the handheld electronic device are described in the aforementioned embodiments, and therefore detailed description thereof is not repeated. Next, a force is applied to the second body 120 to slide the second body 120 from the first position A to the second position B, and now the second body 120 is automatically rotated from the second position B to the third position C, and accordingly the handheld electronic device 100 enters a first operation mode from an initial mode. The operating method of the handheld electronic device 100 is described below.

Figure 9:
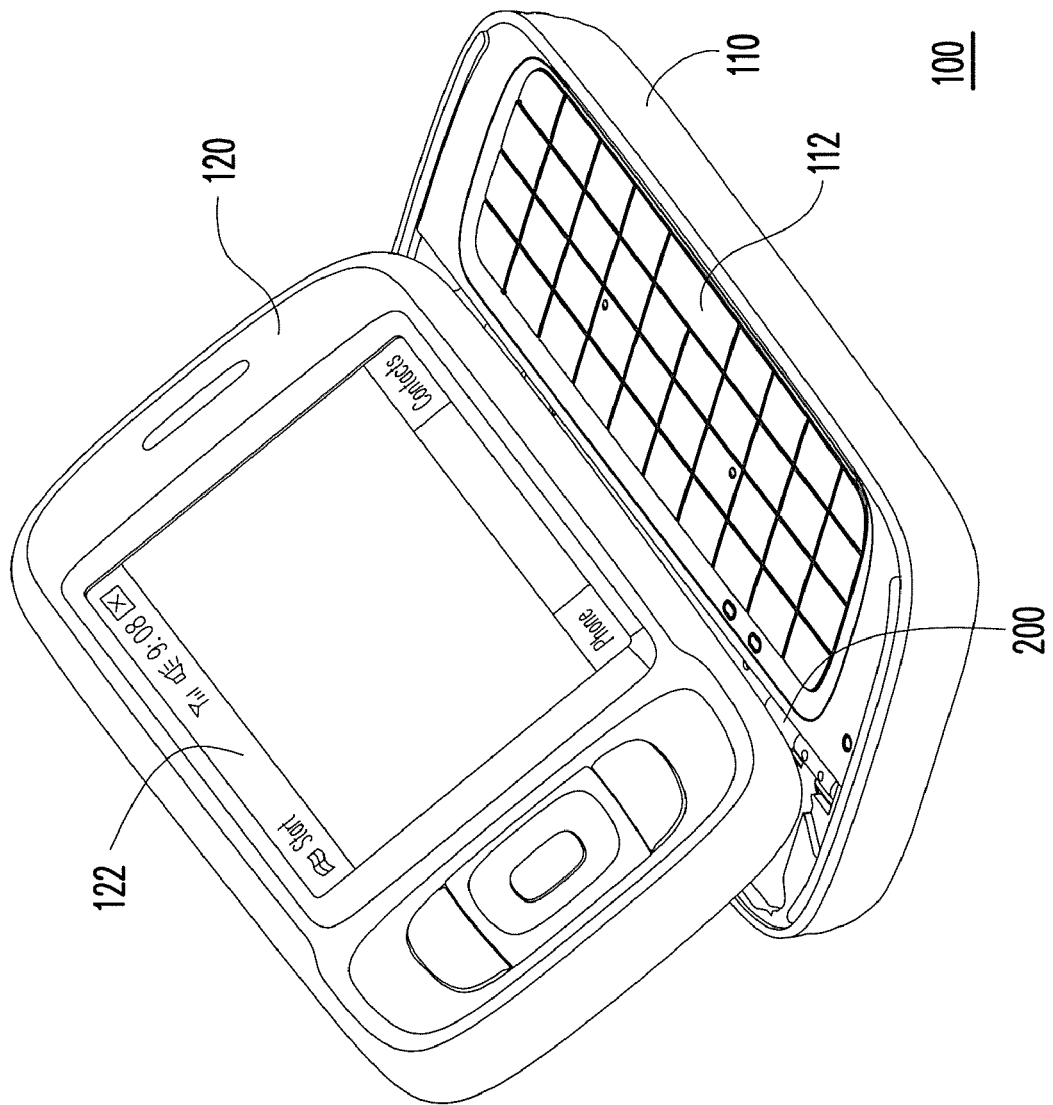
FIG. 9 is a schematic diagram illustrating an appearance of a handheld electronic device of FIG. 1A when a second body thereof is located at a third position.

FIG. 9 is a schematic diagram illustrating an appearance of the handheld electronic device of FIG. 1A when the second body thereof is located at the third position. Referring to FIG. 1A and FIG. 9, when the handheld electronic device 100 is in the initial mode, a displayed image of the handheld electronic device 100 can be a portrait viewing shown as FIG. 1A. When the force is applied to the second body 120 to slide the second body 120 from the first position A to the second position B, the second body 120 is automatically rotated form the second position B to the third position C, and the handheld electronic device 100 enters the first operation mode from the initial mode. Now, the displayed image of the handheld electronic device 100 is changed to a landscape viewing of FIG. 9 from the portrait viewing of FIG. 1A. Therefore, the user can operate the keyboard while simultaneously viewing the landscape viewing image, and a problem of inconsistency of the displayed image and a keyboard direction can be avoided, so that the application programs desired to be operated can be conveniently selected.

On the other hand, in the present embodiment, the operating method of the handheld electronic device 100 further includes applying a force to the second body 120 to rotate the second body 120 between the third position C and the fourth position D, so that the handheld electronic device 100 can enter a second operation mode. In the second operation mode, the handheld electronic device 100 can be set to automatically execute other specific functions, or continually execute the original function, which is not limited by the present application. For example, the first operation mode is to play a movie in a window mode, and the second operation mode is to play the movie in a full-screen mode. In detail, when the user holds the handheld electronic device 100 by hands to watch a movie, and if the user further puts the handheld electronic device 100 on a desk and adjusts the second body 120 to the fourth position D, the handheld electronic device 100 then plays the movie in the full-screen mode. However, contents of the first operation mode and the second operation mode are not limited to the above description, and approaches for executing a program, closing a program, or adjusting a display mode, etc. by adjusting the angle of the second body 120 can all be regarded as the first operation mode and the second operation mode.

In summary, in the handheld electronic device of the present application, when the body is slid to a specific position, it can be automatically rotated, so that the user can easily spread the handheld electronic device. Moreover, regarding the spread handheld electronic device, the user can adjust the angle formed between the bodies according to actual utilization requirement, so that the bodies can satisfy a viewing angle requirement of the user and a user's pose for operating the keyboard. Therefore, the handheld electronic device of the present application is rather practical and convenient.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handheld electronic device, comprising:
   a first body;
   a second body;
   a moving assembly, disposed between the first body and the second body, and the moving assembly comprising:
      a sliding module, coupled to the second body, wherein the second body is restricted to be only moveable between a first position and a second position through the sliding module; and
      at least one rotating module, coupled between the first body and the sliding module, for rotating the second body relative to the first body, wherein the second body is automatically rotated from the second position to a third position to form a first angle with the first body, and the second body is further rotated between the third position and a fourth position to form a second angle with the first body, wherein the second angle is greater than the first angle,
   the sliding module comprises:
      a fixing member, connected to the rotating module;
      a moving member, slidably coupled between the fixing member and the second body,
   the rotating module comprises:
      a base, fixed to the first body, and having a track, and the fixing member having a sliding block slidably disposed in the track;
      a pivot, pivotally connected to the base;
      a linking-up member, having a first connecting part connected to the pivot and a second connecting part pivotally connected to the fixing member; and
      an elastic member, covering the pivot, and two ends thereof respectively leaning against the linking-up member and the base, wherein when the second body is located at the second position, the elastic member drives the linking-up member to rotate relative to the pivot, and drives the sliding block to slide along the track, so that the second body is rotated relative to the first body.

2. The handheld electronic device as claimed in claim 1, wherein the second body is semi-automatically rotated from the third position to the fourth position.

3. The handheld electronic device as claimed in claim 1, wherein the second body is held at any position between the third position and the fourth position.

4. The handheld electronic device as claimed in claim 1, wherein the first angle is greater than approximately 0 degree and is less than approximately 20 degrees.

5. The handheld electronic device as claimed in claim 1, wherein the second angle is between approximately 20 degrees and approximately 50 degrees.

6. The handheld electronic device as claimed in claim 1, wherein the fixing member has two grooves disposed opposite to one another, and the moving member is slidably disposed in the grooves.

7. The handheld electronic device as claimed in claim 1, wherein the track has a plurality of indentations.

8. The handheld electronic device as claimed in claim 1, wherein the elastic member is a torsion spring.

* * * * *